(12) United States Patent
Zhang

(10) Patent No.: US 11,974,221 B2
(45) Date of Patent: Apr. 30, 2024

(54) METHOD AND DEVICE FOR CREATING TRANSMISSION NETWORK SUB-SLICE, AND SYSTEM AND STORAGE MEDIUM

(71) Applicant: XI'AN ZHONGXING NEW SOFTWARE CO., LTD., Xi'an (CN)

(72) Inventor: Sujing Zhang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 322 days.

(21) Appl. No.: 17/611,674

(22) PCT Filed: Mar. 23, 2020

(86) PCT No.: PCT/CN2020/080648
§ 371 (c)(1),
(2) Date: Nov. 16, 2021

(87) PCT Pub. No.: WO2020/233217
PCT Pub. Date: Nov. 26, 2020

(65) Prior Publication Data
US 2022/0217624 A1 Jul. 7, 2022

(30) Foreign Application Priority Data
May 17, 2019 (CN) .......................... 201910411310.5

(51) Int. Cl.
*H04W 28/02* (2009.01)
*H04W 24/02* (2009.01)
(Continued)

(52) U.S. Cl.
CPC ........... *H04W 48/18* (2013.01); *H04W 24/02* (2013.01); *H04W 28/0268* (2013.01);
(Continued)

(58) Field of Classification Search
None
See application file for complete search history.

(56) References Cited

U.S. PATENT DOCUMENTS

2020/0367129 A1\* 11/2020 Raheem ............ H04W 28/0268

FOREIGN PATENT DOCUMENTS

| CN | 107911850 A | 4/2018 |
|---|---|---|
| CN | 109286954 A | 1/2019 |

(Continued)

OTHER PUBLICATIONS

Alisa Devlic, NESMO: Network Slicing Management and Orchestration Framework, Jul. 2017, IEEE, pp. 1-7 (Year: 2017).\*

(Continued)

*Primary Examiner* — Kouroush Mohebbi

(57) ABSTRACT

A method, device and system for creating a transmission network sub-slice, and a non-transitory computer-readable storage medium are disclosed. The method may include: acquiring values of transmission universal user parameters; determining a service definition template for the transmission network sub-slice; sending a value of a template name or template ID, a value of information of an interworking network element endpoint and a value of an SLA attribute of the transmission network sub-slice; receiving these values; and creating the transmission network sub-slice according to transmission technical parameters of X layers of services defined in the service definition template corresponding to the value of the template name or template ID, the value of the information of the interworking network element endpoint and the value of the SLA attribute.

25 Claims, 4 Drawing Sheets

(51) Int. Cl.
*H04W 28/18* (2009.01)
*H04W 28/20* (2009.01)
*H04W 28/24* (2009.01)
*H04W 48/18* (2009.01)

(52) U.S. Cl.
CPC ........... *H04W 28/18* (2013.01); *H04W 28/20* (2013.01); *H04W 28/24* (2013.01)

(56) References Cited

FOREIGN PATENT DOCUMENTS

| WO | 2018137196 A1 | 8/2018 |
| WO | 2018170647 A1 | 9/2018 |
| WO | 2019029267 A1 | 2/2019 |
| WO | 2019062584 A1 | 4/2019 |

OTHER PUBLICATIONS

International Searching Authority. International Search Report and Written Opinion for PCT Application No. PCT/CN2020/080648 and English translation, dated Jun. 12, 2020, pp. 1-10.
3GPP Technical Specification Group. "3rd Generation Partnership Project; Technical Specification Group Services and System Aspects; Management and orchestration; Provisioning (Release 16)," 2019, pp. 1-65.
European Patent Office. Extended European Search Report for EP Application No. 20810751.6, dated Jun. 27, 2022, pp. 1-12.

* cited by examiner

METHOD AND DEVICE FOR CREATING TRANSMISSION NETWORK SUB-SLICE, AND SYSTEM AND STORAGE MEDIUM

CROSS-REFERENCE TO RELATED APPLICATION

This application is a national stage filing under 35 U.S.C. § 371 of international application number PCT/CN2020/080648, filed on Mar. 23, 2020, which claims priority to Chinese patent application No. 201910411310.5 filed on May 17, 2019. The contents of these applications are incorporated herein by reference in their entirety.

TECHNICAL FIELD

The present disclosure relates to the fields of computers and transmission communication, in particular, to a method, device and system for creating a transmission network sub-slice, and a non-transitory computer-readable storage medium.

BACKGROUND

The 5th Generation mobile communication system (5G) can be applied to a plurality of network service scenarios and even more in the future. However, the requirements of 5G services, in terms of mobility, bandwidth, time delay, reliability, security, operation accounting and so on, are quite different. For example, 4K/8K mobile video services (such as Enhanced Mobile Broadband (eMBB)) require ultra-high bandwidth and ultra-high-speed mobility, and autonomous driving and remote control applications (such as Ultra Reliable Low Latency Communication (URLLC)) require ultra-low latency (less than 1 millisecond (ms)) and high reliability. However, each service type requires uneven network multi-capabilities. The 5G network slice can flexibly allocate network resources and flexibly combine network capabilities. Based on a 5G physical network, a number of logical sub-networks with different characteristics are virtualized to provide customized network services for different scenarios. The 5G network slice is an end-to-end network slice, which usually consists of Core Network (CN) sub-slice, Radio Access Network (RAN) sub-slice and Transmission Network (TN) sub-slice.

The network slicing scheme mainly focuses on CN sub-slice and RAN sub-slice, while the research on TN sub-slice is less. TN sub-slice is responsible for the connectivity from RAN side to CN side in 5G network slice, which is an important part of 5G network slice. If TN sub-slice can't be enabled quickly, the wireless domain and core domain in 5G network slice will not be connected, and multiple domains will become isolated islands of information. Therefore, on-demand customization, simple configuration and quick enabling of TN sub-slices are necessary conditions for on-demand customization and quick enabling of 5G network slices. Therefore, it's important to develop technical schemes for on-demand customization, simple configuration and quick enabling of TN sub-slices.

SUMMARY

Several embodiments of the present disclosure provide a method, device and system for creating a transmission network sub-slice, and a non-transitory computer-readable storage medium, which can simply realize on-demand customization, simple configuration and quick enabling of the transmission network sub-slice.

An embodiment of the present disclosure provides a method for creating a transmission network sub-slice, which may include: acquiring, by a network slice management device, values of transmission universal user parameters; where the values of the transmission universal user parameters include a value of information of an interworking network element endpoint and a value of a Service Level Agreement (SLA) attribute of a transmission network sub-slice; determining, by the network slice management device, a service definition template for the transmission network sub-slice; sending, by the network slice management device, a value of a template name or a template ID of the determined service definition template for the transmission network sub-slice, the value of the information of the interworking network element endpoint and the value of the SLA attribute of the transmission network sub-slice; receiving, by the transmission network sub-slice management device, the value of the template name or the template ID, the value of the information of the interworking network element endpoint and the value of the SLA attribute of the transmission network sub-slice; and creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

An embodiment of the present disclosure provides a method for creating a transmission network sub-slice, which may include: acquiring values of transmission universal user parameters; where the values of the transmission universal user parameters include a value of information of an interworking network element endpoint and a value of a Service Level Agreement (SLA) attribute of a transmission network sub-slice; determining the service definition template for the transmission network sub-slice; sending a value of a template name or a template ID of the determined service definition template for the transmission network sub-slice, the value of the information of the interworking network element endpoint and the value of the SLA attribute of the transmission network sub-slice.

An embodiment of the present disclosure provides a method for creating a transmission network sub-slice, which may include: receiving a value of a template name or a template ID, a value of information of an interworking network element endpoint and a value of a Service Level Agreement (SLA) attribute of a transmission network sub-slice; creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

An embodiment of the present disclosure provides a device for creating a transmission network sub-slice, which may include: a universal user parameter acquisition module, configured to acquire values of transmission universal user parameters; where the values of the transmission universal user parameters include a value of information of an interworking network element endpoint and a value of a Service Level Agreement (SLA) attribute of a transmission network sub-slice; a template determination module, configured to determine the service definition template for the transmission network sub-slice; an information sending module, configured to send a value of a template name or a template ID of the determined service definition template for the transmission network sub-slice, the value of the information of the interworking network element endpoint and the value of the SLA attribute of the transmission network sub-slice.

An embodiment of the present disclosure provides a device for creating a transmission network sub-slice, which may include: a message receiving module, configured to receive a value of a template name or a template ID, a value of information of an interworking network element endpoint and a value of a SLA attribute of a transmission network sub-slice; a transmission network sub-slice creation module, configured to create a transmission network sub-slice, according to transmission technical parameters of X layers of services defined in a service definition template for the transmission network sub-slice corresponding to the value of the template name or the template ID, the value of the information of the interworking network element endpoint and the value of the SLA attribute of the transmission network sub-slice; where X is an integer greater than or equal to 1.

An embodiment of the present disclosure provides a device for creating a transmission network sub-slice, which may include a processor, and a non-transitory computer-readable storage medium storing instructions which, when executed by the processor, cause the processor to perform any of the above-mentioned methods for creating a transmission network sub-slice.

An embodiment of the present disclosure provides a non-transitory computer-readable storage medium storing instructions which, when executed by a processor, cause the processor to perform any of the above-mentioned methods for creating a transmission network sub-slice.

An embodiment of the present disclosure provides a system for creating a transmission network sub-slice, which may include: a network slice management device, configured to: acquire values of transmission universal user parameters; where the values of the transmission universal user parameters include a value of information of an interworking network element endpoint and a value of a Service Level Agreement (SLA) attribute of a transmission network sub-slice; determine the service definition template for the transmission network sub-slice; send a value of a template name or a template ID of the determined service definition template for the transmission network sub-slice, the value of the information of the interworking network element endpoint and the value of the SLA attribute of the transmission network sub-slice; a transmission network sub-slice management device, configured to: receive the value of the template name or the template ID, the value of the information of the interworking network element endpoint and the value of the SLA attribute of the transmission network sub-slice; create a transmission network sub-slice, according to transmission technical service parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

DETAILED DESCRIPTION

Hereinafter, the embodiments of the present disclosure will be described with reference to the accompanying drawings.

The steps shown in the flowchart of the drawings can be executed in a computer system with such as a set of computer-executable instructions. Furthermore, although the logical order is shown in the flowcharts, in some cases, the steps shown or described may be performed in a different order.

There are many kinds of transmission technologies, each of which has many parameters and complex technical details. If too many technical details of TN sub-slices are revealed in 5G network slices, there will be strong coupling between the 5G slice management system and transmission network TN sub-slice management system, the systems will be complex and the system reliability will be low. At the same time, users of 5G network slices are required to know the details of transmission technologies, however, slice arrangement is complex and difficult to operate, which has a direct impact on the end-to-end enabling and popularization of 5G network slices. For example, Layer 3 Virtual Private Network (L3VPN) and Segment Routing (SR) Tunnel's TN sub-slice, which are commonly used in 5G network slicing, each transmission technology involves dozens of service configuration parameters, If all the service parameters of the transmission network TN sub-slice are revealed to the 5G network slicing system, the complexity of the 5G network slicing system will be increased, which will affect the reliability of the system. At the same time, when the 5G network slicing users configure the transmission network TN sub-slice, the configuration is complicated and difficult, which will directly affect the enabling of 5G network slicing.

Figure 1:
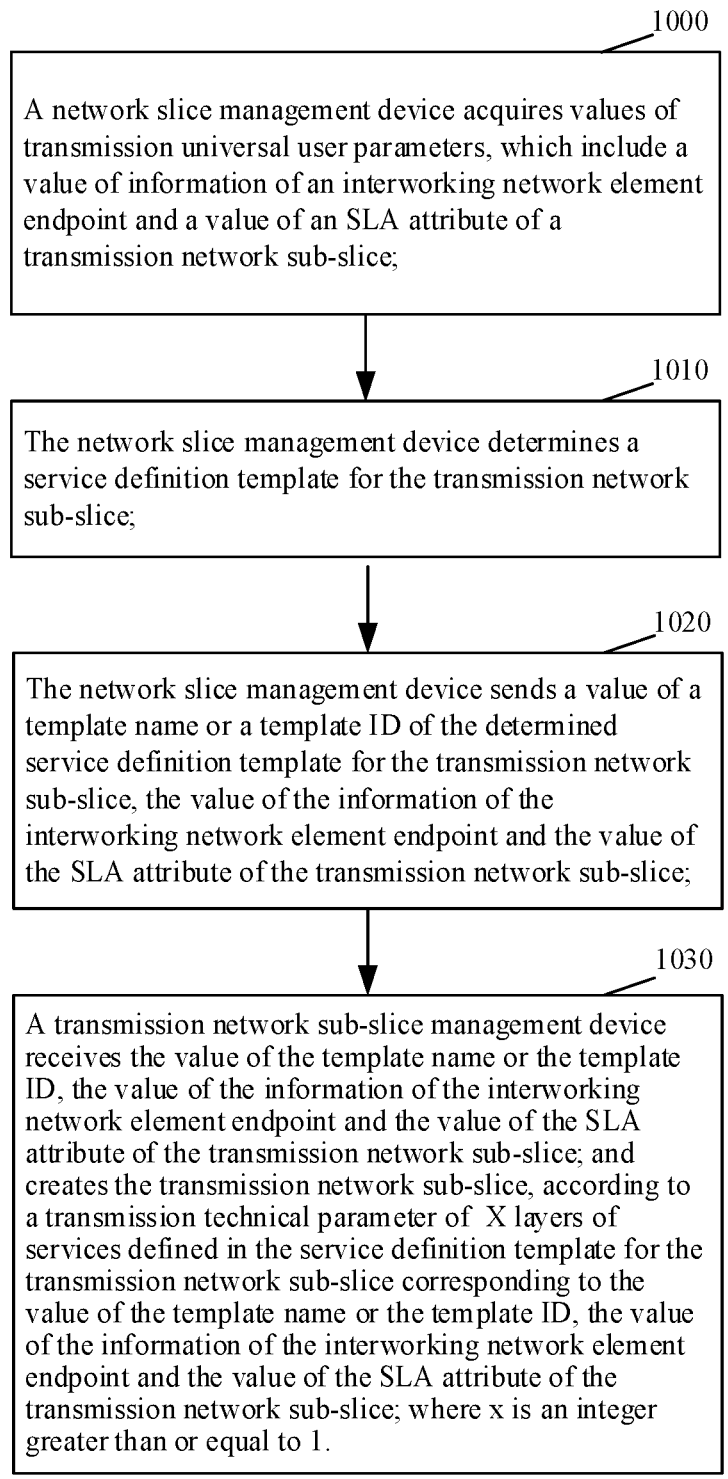
FIG. 1 is a flow chart of a method for creating a transmission network sub-slice according to an embodiment of the present disclosure.

Referring to FIG. 1, an embodiment of the present disclosure provides a method for creating a transmission network sub-slice, including the following operations.

At step 1000, a network slice management device acquires values of transmission universal user parameters; where the values of the transmission universal user parameters include a value of information of an interworking network element (NE) endpoint and a value of a Service Level Agreement (SLA) attribute of a transmission network sub-slice.

In an embodiment of the present disclosure, the values of the transmission universal user parameters are acquired by user input, as shown in the rightmost column of Table 1-1 to Table 1-3, which are the values of the transmission universal user parameters input by the users.

TABLE 1-1

List of transmission universal user parameters

| | | | |
|---|---|---|---|
| Transmission network sub-slice ID | | | BN-NSS-01 |
| Name of transmission network sub-slice | | | BN-NSS |
| Name or ID of service definition template for transmission network sub-slice | | | 1 |
| Virtual link List (VLLIST) | | | |
| 1 | Network Interworking NE Endpoints List (TPLIST) | | |
| | | Endpoint | Endpoint 1 |
| | | Endpoint | Endpoint 2 |
| | | Endpoint | Endpoint 3 |
| | | ... | ... |
| | Bandwidth (kbps) | | 10000000 |
| | Time delay (ms) | | 5 |
| | Extended parameter | | |
| Extended parameter | | | |

TABLE 1-2

Endpoint 1

| | |
|---|---|
| Name of network element | Network element 1 |
| Port name | gei1-1-1 |
| Role | Service Provider-end PE (SPE) |
| Internet protocol (IP)/MASK | 192.10.10.1/255.255.255.0 |
| Virtual local area network (VLAN) | 1 |
| Extended parameter | Null |

TABLE 1-3

Endpoint 2

| | |
|---|---|
| Name of network element | Network element 2 |
| Port name | gei1-1-1 |
| Role | SPE |
| IP/MASK | 192.10.10.2/255.255.255.0 |
| VLAN | 1 |
| Extended parameter | Null |

In an example, the value of information of an interworking network element endpoint can be selected and specified by the user from the border network element information list and endpoint list (such as Table 1-2 and Table 1-3) of the transmission network or the transmission network sub-slice.

The border network element information list and endpoint list can be acquired in advance from the transmission network sub-slice management device through the northbound interface of query resources. For example, the border network element information list and endpoint list can be acquired by sending a first query message, that is, sending a message to query the border network element information list and endpoint list, and receiving the first query result, which includes the border network element information list and endpoint list.

In an embodiment of the present disclosure, due to the different networking of different transmission service types, the roles of endpoints in networking are different, and different roles have different functions in the network. Through the network element endpoints and roles, the positions of interworking endpoints of different networking are expressed for the subsequent transmission network sub-slice management.

For example, in L3VPN, endpoints have the roles of Network facing Provider Edge (NPE), Service Provider-end PE (SPE) and User facing Provider Edge (UPE).

For another example, to measure the time delay from the access side (User) to the core side (Network), it is necessary to select the UPE and the NPE to measure the time delay, instead of arbitrarily selecting two endpoints. For another example, the private line service in Layer 2 Virtual Private Network (L2VPN) has an endpoint A and endpoint Z, which represent two endpoints of the private line.

In an example, as shown in Table 1-1 to Table 1-3, the information of an interworking network element endpoint includes M endpoint information, where M is an integer greater than or equal to 1, and each endpoint information includes the Identifier (ID) of the network element where the endpoint is located, the name of the network element, the name of the endpoint, the role of the endpoint, the Internet Protocol (IP) address of the endpoint, and the Virtual Local Area Network (VLAN) where the endpoint is located.

In another embodiment, the information of an interworking network element endpoint further include extended parameters.

The extended parameters are used to cope with possible parameter changes in the future. The extended parameters can be defined by name-value pair List <NVString>, as shown in Table 2.

TABLE 2

| Information element | Mandatory | Number of instances | Data type | Description |
|---|---|---|---|---|
| Name | M | 1 | String | Parameter name |
| Value | M | 1 | String | Parameter value |

In an example, as shown in Table 3-1 and Table 3-2, an SLA attribute includes at least one selected from the following: bandwidth, time delay, isolation (i.e. extent of isolation), sharing or not, and extended parameter.

TABLE 3-1

| SLA attribute | | |
|---|---|---|
| Information element | Data type | Description |
| Key word | String | SLA type: bandwidth, time delay, isolation, etc. |
| MAXVALUE | String | Maximum index value |
| MINVALUE | String | Minimum index value |

TABLE 3-2

| | Value of SLA attribute | |
|---|---|---|
| Key word (KEY) | MINVALUE | MAXVALUE |
| Time delay | 1 ms | 10 ms |
| Isolation | Hard isolation | Hard isolation |
| Service type | L3VPN/SR | L3VPN/SR |

In an example, the transmission universal user parameters further include: an activation mode of the transmission network sub-slice, which includes any one of the following: a default activation mode and a manual activation mode.

In an example embodiment, the default activation method refers to a default activation when creating the transmission network sub-slice or a default activation at a predetermined time, and the manual activation mode refers to not activating when creating the transmission network sub-slice, followed by manual activation, after which the transmission network sub-slice can carry out service transmission, that is, the transmission network sub-slice is enabled.

In an embodiment of the present disclosure, the transmission universal user parameters further include at least one selected from the following: extended parameter, transmission network sub-slice ID, transmission network sub-slice name, template name or template ID.

In an example embodiment, the extended parameters are used to cope with possible parameter changes in the future. The extended parameters can be defined by name-value pair List <NVString>, as shown in Table 2.

In an example, the network slice management device can acquire the value of the template name or the template ID in any of the following manners.

In a first manner, a user directly inputs the value of the template name or the template ID, and the network slice management device acquires the value of the template name or the template ID input by the user.

In a second manner, the network slice management device acquires a list of service definition templates for the transmission network sub-slice in advance, the user selects a service definition template from the list of service definition templates for the transmission network sub-slice, and the network slice management device acquires the value of the template name or the template ID of the service definition template selected by the user from the list of service definition templates for the transmission network sub-slice.

Therefore, the value of the template name or the template ID can be acquired by user's direct input; or the value of the template name or the template ID can be acquired by: acquiring the list of service definition templates for the transmission network sub-slice in advance; displaying the acquired list of service definition templates for the transmission network sub-slice; selecting, by the user, a service definition template from the displayed list of service definition templates for the transmission network sub-slice; and acquiring the template name or the template ID of the service definition template for the transmission network sub-slice selected by the user.

In an example, the list of service definition templates of the transmission network sub-slice can be acquired in advance from the transmission network sub-slice management device through the northbound interface of query resources. For example, the list of service definition templates for the transmission network sub-slice can be acquired by sending a second query message, that is, sending a message to query the list of service definition templates for the transmission network sub-slice and receiving the second query result, which includes the list of service definition templates for the transmission network sub-slice.

At step 1010, the network slice management device determines the service definition template for the transmission network sub-slice.

In an example, the network slice management device may determine the service definition template for the transmission network sub-slice in any of the following manners.

In a first manner, the values of transmission universal user parameters also include the value of template name or template ID; the network slice management device determines the service definition template for the transmission network sub-slice corresponding to the value of the template name or the template ID. That is, the service definition template for the transmission network sub-slice selected by the user is adopted.

In a second manner, the values of transmission universal user parameters also include the value of template name or template ID; the network slice management device determines the service definition template for the transmission network sub-slice corresponding to the value of the template name or the template ID, when a value of an SLA attribute of a service definition template for the transmission network sub-slice corresponding to the value of the template name or the template ID matches the value of the SLA attribute of the transmission network sub-slice; when a value of an SLA attribute of a service definition template for the transmission network sub-slice corresponding to the value of the template name or the template ID does not match the value of the SLA attribute of the transmission network sub-slice, the network slice management device re-acquires the value of the SLA attribute of the transmission network sub-slice or re-acquires the value of the template ID or template name of the service definition template for the transmission network sub-slice.

In a third manner, the network slice management device acquires a list of service definition templates for the transmission network sub-slice in advance; and selects a service definition template for the transmission network sub-slice having a value of an SLA attribute matching the value of the SLA attribute of the transmission network sub-slice, from the list of service definition templates for the transmission network sub-slice.

In the third manner, when there is only one service definition template for the transmission network sub-slice having a value of an SLA attribute matching that of the transmission network sub-slice, the network slice management device selects the service definition template for the transmission network sub-slice having a value of an SLA attribute matching that of the transmission network sub-slice; when there are N service definition templates for the transmission network sub-slice each having a value of an SLA attribute matching that of the transmission network sub-slice, where N is an integer greater than or equal to 2, the network slice management device selects one of the N service definition templates for the transmission network sub-slice each having a value of an SLA attribute matching that of the transmission network sub-slice. A respective one of the service definition templates for the transmission network sub-slice can be randomly selected by the system, or a respective one of the service definition templates for the transmission network sub-slice can be selected by the user.

In an embodiment of the present disclosure, whether a value of an SLA attribute of a service definition template for the transmission network sub-slice matches the value of the SLA attribute of the transmission network sub-slice can be judged in the following manners.

When a service type in the value of the SLA attribute of the service definition template for the transmission network sub-slice is the same as that of the service type in the value of the SLA attribute of the transmission network sub-slice, the isolation in the value of the SLA attribute of the service definition template for the transmission network sub-slice is the same as that in the value of the SLA attribute of the transmission network sub-slice, and the time delay in the value of the SLA attribute of the service definition template for the transmission network sub-slice is within the range (that is, the range that meets the user's time delay requirement) of the time delay in the value of the SLA attribute of the transmission network sub-slice, it is determined that the value of the SLA attribute of the service definition template for the transmission network sub-slice matches the value of the SLA attribute of the transmission network sub-slice; when a service type in the value of the SLA attribute of the service definition template for the transmission network sub-slice is different from that of the service type in the value of the SLA attribute of the transmission network sub-slice, or the isolation in the value of the SLA attribute of the service definition template for the transmission network sub-slice is different from that in the value of the SLA attribute of the transmission network sub-slice, or the time delay in the value of the SLA attribute of the service definition template for the transmission network sub-slice is out of the range (that is, not within the range that meets the user's time delay requirement) of the time delay in the value of the SLA attribute of the transmission network sub-slice, it is determined that the value of the SLA attribute of the service definition template for the transmission network sub-slice does not match the value of the SLA attribute of the transmission network sub-slice.

For example, in the value of the SLA attribute of 5G Virtual Reality (VR) service scenario, the value of time delay is 5 milliseconds (ms), the value of isolation is hard isolation, and the value of service type is L3VPN/SR. Then, according to the value of the SLA attribute of 5G service, a service definition template for a transmission network sub-slice, which complies with a matching rule that the value of service type and isolation being consistent, and the value of time delay being within the range, is matched to be the service template for a transmission network VR service sub-slice.

To sum up, the user can select or input a service definition template for the transmission network sub-slice, or input a value of an SLA attribute of the transmission network sub-slice, and the system can match the value of the SLA attribute of the transmission network sub-slice.

In an embodiment of the present disclosure, the list of service definition templates for the transmission network sub-slice can be acquired by sending a third query message, that is, sending a message to query the list of service definition templates for the transmission network sub-slice and receiving the third query result, which includes the list of service definition templates for the transmission network sub-slice.

In an example, as shown in Table 5, the list of service definition templates for the transmission network sub-slice include template names or template IDs of the service definition templates for the transmission network sub-slice.

In another example, the list of service definition templates for the transmission network sub-slice may further include at least one selected from the following: service type list, network slice type, domain type, vendor, template status, SLA attribute table, without a need of a transmission technical service parameter table.

At step 1020, the network slice management device sends the value of the template name or the template ID of the determined service definition template for the transmission network sub-slice, the value of the information of the interworking network element endpoint and the value of the SLA attribute of the transmission network sub-slice.

In an embodiment of the present disclosure, the network slice management device can send the value of the template name or the template ID, the value of the information of the interworking network element endpoint and the value of the SLA attribute of the transmission network sub-slice, through the northbound interface.

In an embodiment of the present disclosure, the network slice management device can send the value of the template name or the template ID, the value of the information of the interworking network element endpoint and the value of the SLA attribute of the transmission network sub-slice, in any proper manner, for example in the form of a message, which are not limited in the embodiments of the present disclosure.

At step 1030, the transmission network sub-slice management device receives the value of the template name or the template ID, the value of the information of the interworking network element endpoint and the value of the SLA attribute of the transmission network sub-slice; creates a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

In an example, when the network slice management device sends the value of the template name or the template ID, the value of the information of the interworking network element endpoint and the value of the SLA attribute of the transmission network sub-slice in the form of a message, the transmission network sub-slice management device analyzes the message after receiving the message from the northbound interface, and acquires the value of the template name or the template ID, the value of the information of the interworking network element endpoint and the value of the SLA attribute of the transmission network sub-slice from the message; the transmission technical parameters of X layers of services defined in the service definition template for the transmission network sub-slice corresponding to the value of the template name or the template ID can be read locally.

In an example, according to the transmission technical parameters of X layers of services, the value of the information of the interworking network element endpoint and the value of the SLA attribute of the transmission network sub-slice, creating the transmission network sub-slices includes: creating the X layers of services in the transmission network sub-slice according to the transmission technical parameters of the X layers of services; establishing a virtual node, a virtual port and a virtual link, according to the value of the information of the interworking network element endpoint, the value of the SLA attribute of the transmission network sub-slice, and the created X layers of services.

In an embodiment of the present disclosure, because the defined transmission technical parameters in the service definition template for the transmission network sub-slice are transmission technical parameters for a creation of a service of the transmission network sub-slice. The existing technology requires the user to input transmission technical parameters of a layer of service to realize the creation of a layer of services, which is relatively complicated and inefficient, while the embodiments of the present disclosure realizes an automatic creation of multi-layer services based on the service definition template for the transmission network sub-slice and the values of the transmission universal user parameters, and does not require the user to input the transmission technical parameters layer by layer. According to the template name or the template ID of the service definition template for the transmission network sub-slice, the transmission technical parameters of the X layers of services corresponding to the template name or the template ID in the local database is read, calculation is performed from the upper client layer in the transmission service model according to the relationship between the client layer and the service layer of the service in the transmission technical model, the routes of multi-layers of services are sequentially calculated, services are sequentially created from the lower layer in the transmission service model, the existing service creation interface is reused. For each layer of service, according to the transmission technical parameters and the calculated route of the service in this layer, a cross-link table or routing table is distributed to a device, and multi-layers of services are automatically and sequentially created, thus the creation of multi-layers of services can be completed in the sub-slice. Which layer of service is to be created, is determined according to the services layout and transmission technical parameters defined in the service definition template for the transmission network sub-slice. The virtual node, virtual port and virtual link are established according to the value of the information of the interworking network element endpoint, the value of the SLA attribute of the transmission network sub-slice, and the created X layers of services. When multi-layers of services are created, Virtual LINK (VLINK) is created, and the transmission network sub-slice is created. Therefore, the transmission network sub-slice can be created quickly, such that the wireless domain and core domain services of the 5G network slice are connected.

The transmission network sub-slice virtual network (VNET) consists of Virtual NODE (VNODE) (as shown in Table 4-1 and Table 4-2), Virtual PORT (VPORT) (as shown in Table 4-3 to Table 4-6) and Virtual LINK (VLINK) (as shown in Table 4-7), which are represented as virtual objects VNODE, VPORT and VLINK.

There is a mapping relationship between the VNODE and a physical network element, which can be a one-to-one or many-to-one mapping relationship, that is, one physical network element can map one VNODE or multiple VNODEs;

The VPORT is an endpoint on the VNDOE, and it has a mapping relationship with an endpoint on a physical network element, which can be a one-to-one relationship.

There is a mapping relationship between the VLINK and the actual service, which can be a one-to-one or one-to-many mapping relationship.

TABLE 4-1

| VNODE name | Virtual network element 1 |
|---|---|
| VNODE ID | 1 |
| Mapping resource ID | 1 |

TABLE 4-2

| VNODE name | Virtual network element 2 |
|---|---|
| VNODE ID | 2 |
| Mapping resource ID | 2 |

TABLE 4-3

| VPORT name | Endpoint U1 of Virtual Network Element 1 |
|---|---|
| VNODE ID | 1 |
| VPORT ID | 1 |
| VPORT type | U side |
| List of Mapping resource ID | (L3VPN layer, 1) |

TABLE 4-4

| VPORT name | Endpoint N1 of Virtual Network Element 1 |
|---|---|
| VNODE ID | 1 |
| VPORT ID | 2 |
| VPORT type | N side |
| List of Mapping resource ID | (SR layer, 11) |

TABLE 4-5

| VPORT name | Endpoint U1 of Virtual Network Element 2 |
|---|---|
| VNODE ID | 2 |
| VPORT ID | 1 |
| VPORT type | U side |
| List of Mapping resource ID | (L3VPN layer, 1) |

TABLE 4-6

| VPORT name | Endpoint N1 of Virtual Network Element 2 |
|---|---|
| AVNODE ID | 2 |
| AVPORT ID | 2 |
| VPORT type | N side |
| List of Mapping resource ID | (SR layer, 11) |

TABLE 4-7

| VLINK name | Virtual Link 1 |
|---|---|
| VNODE ID of End A | 1 |
| VPORT ID of End A | 1 |
| VNODE ID of End Z | 2 |
| VPORT ID of End Z | 1 |
| List of Mapping resource ID | (L3VPN layer, L3VPN service ID 100) (SR layer, SR service ID 200) |

Creating a transmission network sub-slice means creating the objects VNODE, VPORT and VLINK which make up the transmission network sub-slice; and an actual link service mapped by the VLINK is created.

The transmission network sub-slice separates the real resources, which are utilized by the actual link service corresponding to VLINK, from the basic physical resources. The real resources are mapped to virtual resources VNODE, VPORT and VLINK which make up the transmission network sub-slice having a logical network that meets the specific transmission requirements of users. The logical network has characteristics which are consistent with those of a physical network, in order to meet the transmission differentiation requirements of 5G services.

A plurality of VNODEs are established based on a plurality of interworking network elements, and the VNODEs correspond to the interworking physical network elements one by one.

The VPORT can be divided into a user side (U-side) VPORT endpoint and a network side (N-side) VPORT endpoint. Generally, the U-side VPORT is mapped to an interworking physical network element endpoint in the transmission universal user parameters. The N-side VPORT has a mapping relationship with the N-side physical network element endpoint of the actual service corresponding to the VLINK. If a VLINK corresponds to multi-layers of actual services, then a VPORT can be mapped to multi-layers of physical network element endpoints, that is, one VPORT is mapped to a list of physical network element endpoints, where each layer is a mapped physical network element endpoint according to the layers defined by the service definition template for the transmission network sub-slice. The VPORT belonging to the same physical network element belongs to the same VNODE.

VLINK is established according to the service definition template for the transmission network sub-slice. VLINK is a virtual logical link, and one VLINK is mapped to the multiple L1/L2/L3 layers of actual services in the transmission service model.

For example, in the case of transmission sub-slice template for VR, a VLINK is mapped to the actual services of L3VPN and SR tunnel in the transmission service model. According to the template name or the template ID of the template defined by the transmission sub-slice service for VR, the transmission technical parameter table corresponding to the template name or the template ID in the local database is read, the values of transmission universal user parameters in the message is read, and L3VPN and SR tunnel services are sequentially calculated and created. The calculation starts with L3VPN in the transmission service model. According to the routing strategy in the sub-slice template and the service parameters, such as that L3VPN is a FULLMESH network, etc., calculation is performed to determine which SR tunnels are needed by L3VPN. For example, to provide L3VPN services between endpoint 1 of network element 1 and endpoint 2 of network element 2, it is necessary to first create an SR tunnel between network element 1 and network element 2, and then create L3VPN services based on the SR tunnels.

The service creation starts from SR tunnel in the service layer of the transmission service model, and then L3VPN is created. The existing interfaces for creating L3VPN and SR tunnel are used to create multi-layers of services in turn, and the parameters of multi-layers of services are distributed to the network element devices in a cross-link table or routing table, so that L3VPN and SR tunnel of the layer of service are enabled. When multi-layers of services are enabled, VLINK is enabled, and the transmission sub-slice is enabled. Therefore the transmission sub-slice can be quickly created and enabled, and the wireless domain and core domain services of the 5G network slice are connected.

In another embodiment of the present disclosure, the method further includes the following operations.

The transmission network sub-slice management device returns a transmission network sub-slice creation-success message or a transmission network sub-slice creation-failure message; or, the network slice management device sends a message to inquire whether the transmission network sub-slice is created successfully, and the transmission network sub-slice management device returns a transmission network sub-slice creation-success message or a transmission network sub-slice creation-failure message; or, the network slice management device sends a message to inquire a creation progress of the transmission network sub-slice, and the transmission network sub-slice management device returns a creation progress message of the transmission network sub-slice.

That is, after sending a message of creating transmission network sub-slice, the network slice management device can wait for the message of success of creating transmission network sub-slice, or the message of failure of creating transmission network sub-slice, which is automatically returned by the transmission network sub-slice management device. Alternatively, the network slice management device can determine whether the transmission network sub-slice is successfully created by regularly sending inquiry messages (including inquiring whether the transmission network sub-slice is successfully created or not, inquiring the transmission network sub-slice creation progress message, etc.).

In another embodiment of the present disclosure, before the transmission network sub-slice management device receives the creation message, the method further includes the following operations.

The transmission network sub-slice management device defines a service definition template for the transmission network sub-slice in advance according to a transmission technical service model and a transmission requirement of a service scenario, and issues the service definition template for the transmission network sub-slice, where the service definition template for the transmission network sub-slice defines transmission technical parameters of X layers of services for the creation of the transmission network sub-slice.

In another embodiment of the present disclosure, the method further includes: verifying the transmission technical parameters of the X layers of services, and continuing to execute the step of issuing the service definition template for the transmission network sub-slice if the verification is passed.

In an example, at least one selected from the following parameters is also defined in the transmission network sub-slice definition template: a basic parameter, an SLA attribute.

In an example, the transmission technical parameters of the X layers of services are encapsulated in the service definition template for the transmission network sub-slice.

In an embodiment of the present disclosure, the significance of the service definition template for the transmission network sub-slice is explained as follows. Different transmission technical parameter tables represent different transmission technologies. In actual use, there may be dozens or hundreds of transmission technical service parameters to be set in the transmission technical parameter table. If these transmission technical parameters are set by the user, such operation is difficult and complicate, which leads to a high technical threshold. The embodiments of the present disclosure provide the template names or IDs and SLA attribute parameters corresponding to the service definition templates of the transmission network sub-slice for the user to choose, which simplifies the user's configuration of the transmission network sub-slice, and make the network slicing system simpler.

In an embodiment of the present disclosure, the service definition template for the transmission network sub-slice is related to a transmission technology, independent of a transmission network, and suitable for various transmission networks.

In an embodiment of the present disclosure, as shown in Table 5, the basic parameters of the service definition template for the transmission network sub-slice include at least one selected from the following: template name of the transmission network sub-slice, template ID of the transmission network sub-slice, service layer rate list, network slice type, domain type, manufacturer, version, template status, service parameter table name and SLA attribute table name.

TABLE 5

Basic parameters

| Information element | Data type | Description |
|---|---|---|
| Name of transmission network sub-slice | String | Template name |
| Template ID of the transmission network sub-slice | String | Template ID |
| Service types list | String | L3VPN, SR tunnel |
| Service layer rate list | String | Rate list of slice-related layers of services, use, separation |
| Network slice type | String | Types of eMBB, uRLLC, scene or mass Internet of Things (mMTC), etc. |
| Domain type | String | Transmission domain |
| Manufacturer | String | Customization |
| Version | String | V 1.0, defined by version series |
| Template status | String | The status is available, unavailable |
| Name of transmission service parameters table | String | Name of referenced service parameters table |
| Name of SLA attribute table | String | Name of referenced SLA attribute table |

In an embodiment of the present disclosure, as shown in Table 6 and Table 7, transmission technical parameters include transmission technology-related parameters. Hierarchical transmission technical parameters are defined according to the transmission technical service model. For example, in the 5G slice, the transmission network sub-slice uses L3VPN, a typical transmission technology based on SR tunnel technology, to encapsulate the L3VPN technical parameter, SR tunnel technical parameter and routing policy parameter in the service definition template for the transmission network sub-slice. That is, the transmission technical parameters are not revealed to the network slice, and users do not need to set these parameters, which greatly reduces the complexity of the system, improves the reliability of the system and simply realizes the creation of the transmission network sub-slice.

TABLE 6

Structural definitions of transmission service parameters table

| Information element | Data type | Description |
|---|---|---|
| Key word | String | Name of transmission service parameter |
| Numeral value | String | Value of transmission service parameter |
| Type of transmission service parameter | String | Usually according to hierarchy of transmission technical model, such as parameters of L3VPN, SR tunnel, routing policy |

TABLE 7

Transmission service parameters

| Service type | Transmission service parameter | Parameter value |
|---|---|---|
| L3VPN | Topology type | FULLMESH |
| L3VPN | Type of VPN (VPNTYPE) | Nonstationary |
| L3VPN | Activate now | Activate |
| L3VPN | Traffic statistics | Yes |
| SR tunnel | Tunnel type | SR-TP |
| SR tunnel | Type of protection | Unprotected |
| SR tunnel | Direction | Bidirectional |
| SR tunnel | Activated state | Activate |
| SR tunnel | Traffic statistics | Yes |

Figure 4:
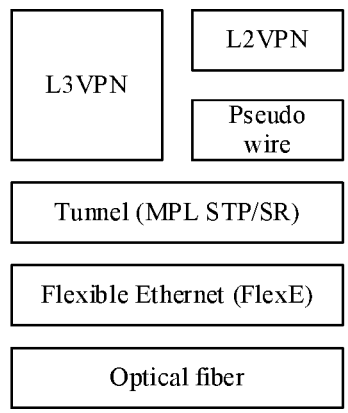
FIG. 4 is a schematic diagram of a transmission technical service model according to an embodiment of the present disclosure.

The transmission technical service model is shown in FIG. 4, the transmission technical service model includes, in the Open System Interconnect (OSI) reference model, L1.5 layer technology such as Flexible Ethernet (FlexE), L2 layer technology such as L2VPN, L2.5 layer technology such as Multi-Protocol Label Switching Transmission Profile (MPL-STP), SR, and L3 layer technology such as L3VPN. For example, the transmission service parameters of L3 layer L3VPN include topology type, VPN type, management status, (whether perform) traffic statistics and other parameters.

In an embodiment of the present disclosure, the transmission technical parameters include some or all transmission technical parameters of all layers of services. For example, L3VPN key parameters, SR tunnel technical parameters and routing policy parameters are included, which are determined according to SLA attribute and transmission technologies of transmission network sub-slices.

In an embodiment of the present disclosure, as shown in Table 3-1 and Table 3-2, an SLA attribute includes at least one selected from the following: bandwidth, time delay, isolation, sharing or not. The SLA attribute according to the embodiments of the present disclosure is used to express the transmission capability of the service definition templates for the transmission network sub-slice.

In an embodiment of the present disclosure, the verification of transmission technical parameters refers to a coordinated verification of transmission technical parameters according to the transmission technical hierarchy to ensure that the transmission technical parameters are within an effective value range, and to ensure that the transmission technical parameters are consistent, effective and non-conflicting. For example, when the management state of L3VPN is active, the management state of the tunnel should also be active.

In an embodiment of the present disclosure, issuing the service definition template for the transmission network sub-slice means saving the service definition template for the transmission network sub-slice, for example, in a database.

By utilizing the transmission network sub-slice definition template according to the embodiments of the present disclosure, the detailed parameters of the transmission technology (i.e., transmission service parameters) are shielded, the parameters of the transmission network sub-slice can be simply configured through the basic parameters and the transmission universal user parameters of the transmission sub-slice service definition template, thus a quick creation can be performed. Therefore, such technical scheme meets the requirement of customization of a 5G slice on demand, simplify the user configuration, and quickly enables the transmission network sub-slice. At the same time, the slicing system and sub-slicing system each has a simple design and high system reliability.

Figure 2:
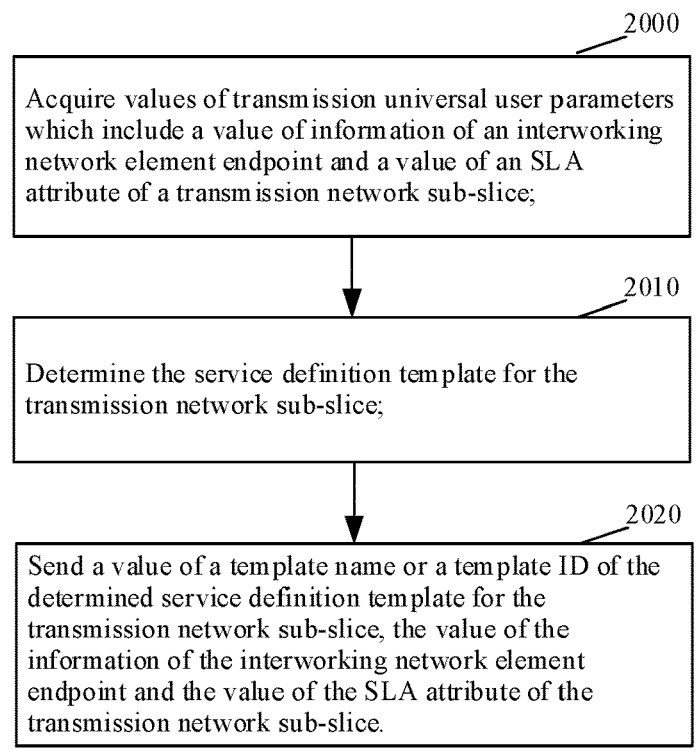
FIG. 2 is a flow chart of a method for creating a transmission network sub-slice applied on a network slice management device according to an embodiment of the present disclosure.

Referring to FIG. 2, an embodiment of the present disclosure provides a method for creating a transmission network sub-slice, including the following operations.

At step 2000, values of transmission universal user parameters are acquired; where the values of the transmission universal user parameters include a value of information of an interworking network element endpoint and a value of a Service Level Agreement (SLA) attribute of a transmission network sub-slice.

In an embodiment of the present disclosure, the values of the transmission universal user parameters are acquired by user input, as shown in the rightmost column of Table 1-1 to Table 1-3, which are the values of the transmission universal user parameters input by the users.

In an example, the value of information of an interworking network element endpoint can be selected and specified by the user from the border network element information list and endpoint list (such as Table 1-2 and Table 1-3) of the transmission network or the transmission network sub-slice. The border network element information list and endpoint list can be acquired in advance from the transmission network sub-slice management device through the northbound interface of query resources. For example, the border network element information list and endpoint list can be acquired by sending a first query message, that is, sending a message to query the border network element information list and endpoint list, and receiving the first query result, which includes the border network element information list and endpoint list.

In an embodiment of the present disclosure, due to the different networking of different transmission service types, the roles of endpoints in networking are different, and different roles have different functions in the network. Through the network element endpoints and roles, the positions of interworking endpoints of different networking are expressed for the subsequent transmission network sub-slice management.

For example, in L3VPN, endpoints have the roles of NPE, SPE and UPE.

For another example, to measure the time delay from the access side (User) to the core side (Network), it is necessary to select the UPE and the NPE to measure the time delay, instead of arbitrarily selecting two endpoints. For another example, the private line service in Layer 2 Virtual Private Network (L2VPN) has an endpoint A and endpoint Z, which represent two endpoints of the private line.

In an example, as shown in Table 1-1 to Table 1-3, the information of an interworking network element endpoint includes M endpoint information, where M is an integer greater than or equal to 1, and each endpoint information includes the Identifier (ID) of the network element where the endpoint is located, the name of the network element, the name of the endpoint, the role of the endpoint, the Internet Protocol (IP) address of the endpoint, and the VLAN where the endpoint is located.

In another embodiment, the information of an interworking network element endpoint further include extended parameters.

The extended parameters are used to cope with possible parameter changes in the future. The extended parameters can be defined by name-value pair List <NVString>, as shown in Table 2.

In an example, as shown in Table 3-1 and Table 3-2, an transmission SLA attribute includes at least one selected from the following: bandwidth, time delay, isolation, sharing or not, and extended parameter.

In an example, the transmission universal user parameters further include: an activation mode of the transmission network sub-slice, which includes any one of the following: a default activation mode and a manual activation mode.

In an example embodiment, the default activation method refers to a default activation when creating the transmission network sub-slice or a default activation at a predetermined time, and the manual activation mode refers to not activating when creating the transmission network sub-slice, followed by manual activation, after which the transmission network sub-slice can carry out service transmission, that is, the transmission network sub-slice is enabled.

In an embodiment of the present disclosure, the transmission universal user parameters further include at least one selected from the following: extended parameter, transmission network sub-slice ID, transmission network sub-slice name, template name or template ID.

In an example embodiment, the extended parameters are used to cope with possible parameter changes in the future. The extended parameters can be defined by name-value pair List <NVString>, as shown in Table 2.

In an example, the value of the template name or the template ID can be acquired in any of the following manners.

In a first manner, a user directly inputs the value of the template name or the template ID, and the value of the template name or the template ID input by the user is acquired.

In a second manner, a list of service definition templates for the transmission network sub-slice is acquired in advance, the user selects a service definition template from the list of service definition templates for the transmission network sub-slice, and the value of the template name or the template ID of the service definition template selected by the user from the list of service definition templates for the transmission network sub-slice is acquired.

That is, the value of the template name or the template ID can be acquired by user's direct input; or the value of the template name or the template ID can be acquired by: acquiring the list of service definition templates for the transmission network sub-slice in advance; displaying the acquired list of service definition templates for the transmission network sub-slice; selecting, by the user, a service definition template from the displayed list of service definition templates for the transmission network sub-slice; and acquiring the template name or the template ID of the service definition template for the transmission network sub-slice selected by the user.

In an example, the list of service definition templates of the transmission network sub-slice can be acquired in advance from the transmission network sub-slice management device through the northbound interface of query resources. For example, the list of service definition templates for the transmission network sub-slice can be acquired by sending a second query message, that is, sending a message to query the list of service definition templates for the transmission network sub-slice and receiving the second query result, which includes the list of service definition templates for the transmission network sub-slice.

At step 2010, a service definition template for the transmission network sub-slice is determined.

In an example, determining the service definition template for the transmission network sub-slice according to the value of the information for determining the service definition template for the transmission network sub-slice can be achieved in any of the following manners:

In a first manner, the values of transmission universal user parameters also include the value of template name or template ID; the service definition template for the transmission network sub-slice corresponding to the value of the template name or the template ID is determined. That is, the service definition template for the transmission network sub-slice selected by the user is adopted.

In a second manner, the values of transmission universal user parameters also include the value of template name or template ID; the network slice management device determines the service definition template for the transmission network sub-slice corresponding to the value of the template name or the template ID, when a value of an SLA attribute of a service definition template for the transmission network sub-slice corresponding to the value of the template name or the template ID matches the value of the SLA attribute of the transmission network sub-slice; when a value of an SLA attribute of a service definition template for the transmission network sub-slice corresponding to the value of the template name or the template ID does not match the value of the SLA attribute of the transmission network sub-slice, the network slice management device re-acquires the value of the SLA attribute of the transmission network sub-slice or re-acquires the value of the template ID or template name of the service definition template for the transmission network sub-slice.

In a third manner, the network slice management device acquires a list of service definition templates for the transmission network sub-slice in advance; and selects a service definition template for the transmission network sub-slice having a value of an SLA attribute matching the value of the SLA attribute of the transmission network sub-slice, from the list of service definition templates for the transmission network sub-slice.

In the third manner, when there is only one service definition template for the transmission network sub-slice having a value of an SLA attribute matching that of the transmission network sub-slice, the network slice management device selects the service definition template for the transmission network sub-slice having a value of an SLA attribute matching that of the transmission network sub-slice; when there are N service definition templates for the transmission network sub-slice each having a value of an SLA attribute matching that of the transmission network sub-slice, where N is an integer greater than or equal to 2, the network slice management device selects one of the N service definition templates for the transmission network sub-slice each having a value of an SLA attribute matching that of the transmission network sub-slice. A respective one of the service definition templates for the transmission network sub-slice can be randomly selected by the system, or a respective one of the service definition templates for the transmission network sub-slice can be selected by the user.

In an embodiment of the present disclosure, whether a value of an SLA attribute of a service definition template for the transmission network sub-slice matches the value of the SLA attribute of the transmission network sub-slice can be judged in the following manners.

When a service type in the value of the SLA attribute of the service definition template for the transmission network sub-slice is the same as that of the service type in the value of the SLA attribute of the transmission network sub-slice, the isolation in the value of the SLA attribute of the service definition template for the transmission network sub-slice is the same as that in the value of the SLA attribute of the transmission network sub-slice, and the time delay in the value of the SLA attribute of the service definition template for the transmission network sub-slice is within the range (that is, the range that meets the user's time delay requirement) of the time delay in the value of the SLA attribute of the transmission network sub-slice, it is determined that the value of the SLA attribute of the service definition template for the transmission network sub-slice matches the value of the SLA attribute of the transmission network sub-slice; when a service type in the value of the SLA attribute of the service definition template for the transmission network sub-slice is different from that of the service type in the value of the SLA attribute of the transmission network sub-slice, or the isolation in the value of the SLA attribute of the service definition template for the transmission network sub-slice is different from that in the value of the SLA attribute of the transmission network sub-slice, or the time delay in the value of the SLA attribute of the service definition template for the transmission network sub-slice is out of the range (that is, not within the range that meets the user's time delay requirement) of the time delay in the value of the SLA attribute of the transmission network sub-slice, it is determined that the value of the SLA attribute of the service definition template for the transmission network sub-slice does not match the value of the SLA attribute of the transmission network sub-slice.

For example, in the value of the SLA attribute of 5G Virtual Reality (VR) service scenario, the value of time delay is 5 milliseconds (ms), the value of isolation is hard isolation, and the value of service type is L3VPN/SR. Then, according to the value of the SLA attribute of 5G service, a service definition template for a transmission network sub-slice, which complies with a matching rule that the value of service type and isolation being consistent, and the value of time delay being within the range, is matched to be the service template for a transmission network VR service sub-slice.

To sum up, the user can select or input a service definition template for the transmission network sub-slice, or input a value of an SLA attribute of the transmission network sub-slice, and the system can match the value of the SLA attribute of the transmission network sub-slice.

In an embodiment of the present disclosure, the list of service definition templates for the transmission network sub-slice can be acquired by sending a third query message, that is, sending a message to query the list of service definition templates for the transmission network sub-slice and receiving the third query result, which includes the list of service definition templates for the transmission network sub-slice.

In an example, as shown in Table 5, the list of service definition templates for the transmission network sub-slice include template names or template IDs of the service definition templates for the transmission network sub-slice.

In another example, the list of service definition templates for the transmission network sub-slice may further include at least one selected from the following: service type list, network slice type, domain type, vendor, template status, SLA attribute table, without a need of a transmission technical service parameter table.

At step 2020, the value of the template name or the template ID of the determined service definition template for the transmission network sub-slice, the value of the information of the interworking network element endpoint and the value of the SLA attribute of the transmission network sub-slice is sent.

In an embodiment of the present disclosure, the network slice management device can send the value of the template name or the template ID, the value of the information of the interworking network element endpoint and the value of the SLA attribute of the transmission network sub-slice, through the northbound interface.

In an embodiment of the present disclosure, the network slice management device can send the value of the template name or the template ID, the value of the information of the interworking network element endpoint and the value of the SLA attribute of the transmission network sub-slice, in any proper manner, for example in the form of a message, which are not limited in the embodiments of the present disclosure.

In another embodiment of the present disclosure, the method further includes: receiving a transmission network sub-slice creation-success message or a transmission network sub-slice creation-failure message; or, sending a message to inquire whether the transmission network sub-slice is created successfully, and receiving a transmission network sub-slice creation-success message or a transmission network sub-slice creation-failure message; or, sending a message to inquire a creation progress of the transmission network sub-slice, and receiving a creation progress message of the transmission network sub-slice.

That is, after sending a message of creating transmission network sub-slice, the message of success or failure of creating transmission network sub-slice can be subsequently automatically returned. Alternatively, whether the transmission network sub-slice is successfully created can be determined by regularly sending inquiry messages (including inquiring whether the transmission network sub-slice is successfully created or not, inquiring the transmission network sub-slice creation progress message, etc.).

Figure 3:
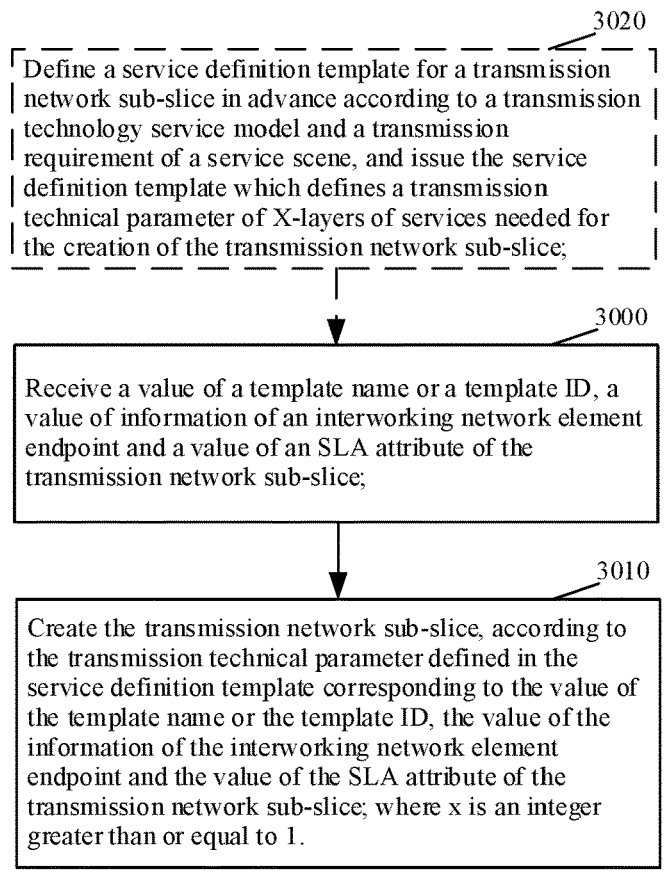
FIG. 3 is a flow chart of a method for creating a transmission network sub-slice applied on a transmission network sub-slice management device according to an embodiment of the present disclosure.

Referring to FIG. 3, an embodiment of the present disclosure provides a method for creating a transmission network sub-slice, including the following operations.

At step 3000, the value of the template name or the template ID, the value of the information of the interworking network element endpoint and the value of the SLA attribute of the transmission network sub-slice are received.

In an embodiment of the present disclosure, the values of the transmission universal user parameters are acquired by user input, as shown in the rightmost column of Table 1-1 to Table 1-3, which are the values of the transmission universal user parameters input by the users.

In an embodiment of the present disclosure, due to the different networking of different transmission service types, the roles of endpoints in networking are different, and different roles have different functions in the network. Through the network element endpoints and roles, the positions of interworking endpoints of different networking are expressed for the subsequent transmission network sub-slice management.

For example, in L3VPN, endpoints have the roles of NPE, SPE and UPE.

For another example, to measure the time delay from the access side (User) to the core side (Network), it is necessary to select the UPE and the NPE to measure the time delay, instead of arbitrarily selecting two endpoints. For another example, the private line service in Layer 2 Virtual Private Network (L2VPN) has an endpoint A and endpoint Z, which represent two endpoints of the private line.

In an example, as shown in Table 1-1 to Table 1-3, the information of an interworking network element endpoint includes M endpoint information, where M is an integer greater than or equal to 1, and each endpoint information includes the Identifier (ID) of the network element where the endpoint is located, the name of the network element, the name of the endpoint, the role of the endpoint, the Internet Protocol (IP) address of the endpoint, and the VLAN where the endpoint is located.

In another embodiment, the information of an interworking network element endpoint further include extended parameters.

The extended parameters are used to cope with possible parameter changes in the future. The extended parameters can be defined by name-value pair List <NVString>, as shown in Table 2.

In an example, as shown in Table 3-1 and Table 3-2, an SLA attribute includes at least one selected from the following: bandwidth, time delay, isolation, sharing or not, and extended parameter.

In an example, the transmission universal user parameters further include: an activation mode of the transmission network sub-slice, which includes any one of the following: a default activation mode and a manual activation mode.

In an example embodiment, the default activation method refers to a default activation when creating the transmission network sub-slice or a default activation at a predetermined time, and the manual activation mode refers to not activating when creating the transmission network sub-slice, followed by manual activation, after which the transmission network sub-slice can carry out service transmission, that is, the transmission network sub-slice is enabled.

In an embodiment of the present disclosure, the transmission universal user parameters further include at least one selected from the following: extended parameter, transmission network sub-slice ID, transmission network sub-slice name, template name or template ID.

In an example embodiment, the extended parameters are used to cope with possible parameter changes in the future. The extended parameters can be defined by name-value pair List <NVString>, as shown in Table 2.

At step 3010, a transmission network sub-slice is created, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

In an example, when the network slice management device sends the value of the template name or the template ID, the value of the information of the interworking network element endpoint and the value of the SLA attribute of the transmission network sub-slice in the form of a message, the transmission network sub-slice management device analyzes the message after receiving the message from the northbound interface, and acquires the value of the template name or the template ID, the value of the information of the interworking network element endpoint and the value of the SLA attribute of the transmission network sub-slice from the message; the transmission technical parameters of X layers of services defined in the service definition template for the transmission network sub-slice corresponding to the value of the template name or the template ID can be read locally.

In an example, according to the transmission technical parameters of X layers of services, the value of the information of the interworking network element endpoint and the value of the SLA attribute of the transmission network sub-slice, creating the transmission network sub-slices includes: creating the X layers of services in the transmission network sub-slice according to the transmission technical parameters of the X layers of services; establishing a virtual node, a virtual port and a virtual link, according to the value of the information of the interworking network element endpoint, the value of the SLA attribute of the transmission network sub-slice, and the created X layers of services.

In an embodiment of the present disclosure, because the defined transmission technical parameters in the service definition template for the transmission network sub-slice are transmission technical parameters for a creation of a service of the transmission network sub-slice. The existing technology requires the user to input transmission technical parameters of a layer of service to realize the creation of a layer of services, which is relatively complicated and inefficient, while the embodiments of the present disclosure realizes an automatic creation of multi-layer services based on the service definition template for the transmission network sub-slice and the values of the transmission universal user parameters, and does not require the user to input the transmission technical parameters layer by layer. According to the template name or the template ID of the service definition template for the transmission network sub-slice, the transmission technical parameters of the X layers of services corresponding to the template name or the template ID in the local database is read, calculation is performed from the upper client layer in the transmission service model according to the relationship between the client layer and the service layer of the service in the transmission technical model, the routes of multi-layers of services are sequentially calculated, services are sequentially created from the lower layer in the transmission service model, the existing service creation interface is reused. For each layer of service, according to the transmission technical parameters and the calculated route of the service in this layer, a cross-link table or routing table is distributed to a device, and multi-layers of services are automatically and sequentially created, thus the creation of multi-layers of services can be completed in the sub-slice. Which layer of service is to be created, is determined according to the services layout and transmission technical parameters defined in the service definition template for the transmission network sub-slice. The virtual node, virtual port and virtual link are established according to the value of the information of the interworking network element endpoint, the value of the SLA attribute of the transmission network sub-slice, and the created X layers of services. When multi-layers of services are created, Virtual LINK (VLINK) is created, and the transmission network sub-slice is created. Therefore, the transmission network sub-slice can be created quickly, such that the wireless domain and core domain services of the 5G network slice are connected.

The transmission network sub-slice virtual network (VNET) consists of Virtual NODE (VNODE) (as shown in Table 4-1 and Table 4-2) (PORT (VPORT) (as shown in Table 4-3 to Table 4-6) and Virtual LINK (VLINK) (as shown in Table 4-7), as represented as virtual objects VNODE, VPORT and VLINK.

There is a mapping relationship between the VNODE and a physical network element, which can be a one-to-one or many-to-one mapping relationship, that is, one physical network element can map one VNODE or multiple VNODEs.

The VPORT is an endpoint on the VNDOE, and it has a mapping relationship with an endpoint on a physical network element, which can be a one-to-one relationship.

There is a mapping relationship between the VLINK and the actual service, which can be a one-to-one or one-to-many mapping relationship.

Creating a transmission network sub-slice means creating the objects VNODE, VPORT and VLINK which make up the transmission network sub-slice; and an actual link service mapped by the VLINK is created.

The transmission network sub-slice separates the real resources, which are utilized by the actual link service corresponding to VLINK, from the basic physical resources. The real resources are mapped to virtual resources VNODE, VPORT and VLINK which make up the transmission network sub-slice having a logical network that meets the specific transmission requirements of users. The logical network has characteristics which are consistent with those of a physical network, in order to meet the transmission differentiation requirements of 5G services.

A plurality of VNODEs are established based on a plurality of interworking network elements, and the VNODEs correspond to the interworking physical network elements one by one.

The VPORT can be divided into a U-side (user side) VPORT endpoint and an N-side (network side) VPORT endpoint. Generally, the U-side (user side) VPORT is mapped to an interworking physical network element endpoint in the transmission universal user parameters. The N-side VPORT has a mapping relationship with the N-side (network side) physical network element endpoint of the actual service corresponding to the VLINK. If a VLINK corresponds to multi-layers of actual services, then a VPORT can be mapped to multi-layers of physical network element endpoints, that is, one VPORT is mapped to a list of physical network element endpoints, where each layer is a mapped physical network element endpoint according to the layers defined by the service definition template for the transmission network sub-slice. The VPORT belonging to the same physical network element belongs to the same VNODE.

VLINK is established according to the service definition template for the transmission network sub-slice. VLINK is a virtual logical link, and one VLINK is mapped to the multiple L1/L2/L3 layers of actual services in the transmission service model.

For example, in the case of transmission sub-slice template for VR, a VLINK is mapped to the actual services of L3VPN and SR tunnel in the transmission service model. According to the template name or the template ID of the template defined by the transmission sub-slice service for VR, the transmission technical parameter table corresponding to the template name or the template ID in the local database is read, the values of transmission universal user parameters in the message is read, and L3VPN and SR tunnel services are sequentially calculated and created. The calculation starts with L3VPN in the transmission service model. According to the routing strategy in the sub-slice template and the service parameters, such as that L3VPN is a full mesh (FULLMESH) network, etc., calculation is performed to determine which SR tunnels are needed by L3VPN. For example, to provide L3VPN services between endpoint 1 of network element 1 and endpoint 2 of network element 2, it is necessary to first create an SR tunnel between network element 1 and network element 2, and then create L3VPN services based on the SR tunnels.

The service creation starts from SR tunnel in the service layer of the transmission service model, and then L3VPN is created. The existing interfaces for creating L3VPN and SR tunnel are used to create multi-layers of services in turn, and the parameters of multi-layers of services are distributed to the network element devices in a cross-link table or routing table, so that L3VPN and SR tunnel of the layer of service are enabled. When multi-layers of services are enabled, VLINK is enabled, and the transmission sub-slice is enabled. Therefore the transmission sub-slice can be quickly created and enabled, and the wireless domain and core domain services of the 5G network slice are connected.

In another embodiment of the present disclosure, after the transmission network sub-slice is created, the method further includes: returning a transmission network sub-slice creation-success message or a transmission network sub-slice creation-failure message; or, receiving a message to inquire whether the transmission network sub-slice is created successfully, and returning a transmission network sub-slice creation-success message or a transmission network sub-slice creation-failure message; or, receiving a message to inquire a creation progress of the transmission network sub-slice, and returning a creation progress message of the transmission network sub-slice.

In another embodiment of the present disclosure, before receiving the creation message, the method further includes: receiving a message of inquiring the list of service definition templates for the transmission network sub-slice, or the border network element information list and endpoint list of the transmission network or the transmission network sub-slice, and sending an inquiry result, where the inquiry result includes the list of service definition templates for the transmission network sub-slice, or the border network element information list and endpoint list of the transmission network or the transmission network sub-slice.

In another embodiment of the present disclosure, before receiving the creation message, the method further includes the following operations.

At step 3020, a service definition template for the transmission network sub-slice is defined in advance according to a transmission technical service model and a transmission requirement of a service scenario, and the service definition template for the transmission network sub-slice is issued, where the service definition template for the transmission network sub-slice defines transmission technical parameters of X layers of services for the creation of the transmission network sub-slice.

In another embodiment of the present disclosure, the method further includes: verifying the transmission technical parameters of the X layers of services, and continuing to execute the step of issuing the service definition template for the transmission network sub-slice if the verification is passed.

In an example, at least one selected from the following parameters is also defined in the transmission network sub-slice definition template: a basic parameter, an SLA attribute.

In an embodiment of the present disclosure, the transmission technical parameters of the X layers of services are encapsulated in the service definition template for the transmission network sub-slice.

In an embodiment of the present disclosure, the significance of the service definition template for the transmission network sub-slice is explained as follows. Different transmission technical parameter tables represent different transmission technologies. In actual use, there may be dozens or hundreds of transmission technical service parameters to be set in the transmission technical parameter table. If these transmission technical parameters are set by the user, such operation is difficult and complicate, which leads to a high technical threshold. The embodiments of the present disclosure provide the template names or IDs and SLA attribute parameters corresponding to the service definition templates of the transmission network sub-slice for the user to choose, which simplifies the user's configuration of the transmission network sub-slice, and make the network slicing system simpler.

In an embodiment of the present disclosure, the service definition template for the transmission network sub-slice is related to the transmission technology, independent of the transmission network, and suitable for various transmission networks.

In an embodiment of the present disclosure, as shown in Table 5, the basic parameters of the service definition template for the transmission network sub-slice include at least one selected from the following: template name of the transmission network sub-slice, template ID of the transmission network sub-slice, service layer rate list, network slice type, domain type, manufacturer, version, template status, service parameter table name and SLA attribute table name.

In an embodiment of the present disclosure, as shown in Table 6 and Table 7, transmission technical parameters include transmission technology-related parameters. Hierarchical transmission technical parameters are defined according to the transmission technical service model. For example, in the 5G slice, the transmission network sub-slice uses L3VPN, a typical transmission technology based on SR tunnel technology, to encapsulate the L3VPN technical parameter, SR tunnel technical parameter and routing policy parameter in the service definition template for the transmission network sub-slice. That is, the transmission technical parameters are not revealed to the network slice, and users do not need to set these parameters, which greatly reduces the complexity of the system, improves the reliability of the system and simply realizes the creation of the transmission network sub-slice.

The transmission technical service model is shown in FIG. 4, the transmission technical service model includes, in the Open System Interconnect (OSI) reference model, L1.5 layer technology such as Flexible Ethernet (FlexE), L2 layer technology such as L2VPN, L2.5 layer technology such as Multi-Protocol Label Switching Transmission Profile (MPL-STP), SR, and L3 layer technology such as L3VPN. For example, the transmission service parameters of L3 layer L3VPN include topology type, VPN type, management status, (whether perform) traffic statistics and other parameters.

In an embodiment of the present disclosure, the transmission technical parameters include some or all transmission technical parameters of all layers of services. For example, L3VPN key parameters, SR tunnel technical parameters and routing policy parameters are included, which are determined according to SLA attribute and transmission technologies of transmission network sub-slices.

In an embodiment of the present disclosure, as shown in Table 3-1 and Table 3-2, an SLA attribute includes at least one selected from the following: bandwidth, time delay, isolation, sharing or not. The SLA attribute according to the embodiments of the present disclosure are used to express the transmission capability of the service definition templates for the transmission network sub-slice.

In an embodiment of the present disclosure, the verification of transmission technical parameters refers to a coordinated verification of transmission technical parameters according to the transmission technical hierarchy to ensure that the transmission technical parameters are within an effective value range, and to ensure that the transmission technical parameters are consistent, effective and non-conflicting. For example, when the management state of L3VPN is active, the management state of the tunnel should also be active.

In an embodiment of the present disclosure, issuing the service definition template for the transmission network sub-slice means saving the service definition template for the transmission network sub-slice, for example, in a database.

By utilizing the transmission network sub-slice definition template according to the embodiments of the present disclosure, the detailed parameters of the transmission technology (i.e., transmission service parameters) are shielded, the parameters of the transmission network sub-slice can be simply configured through the basic parameters and the transmission universal user parameters of the transmission sub-slice service definition template, thus a quick creation can be performed. Therefore, such technical scheme meets the requirement of customization of a 5G slice on demand, simplify the user configuration, and quickly enables the transmission network sub-slice. At the same time, the slicing system and sub-slicing system each has a simple design and high system reliability.

Another embodiment of the present disclosure provides a device for creating a transmission network sub-slice, including a processor, and a non-transitory computer-readable storage medium storing instructions which, when executed by the processor, cause the processor to perform any of the above-mentioned methods for creating a transmission network sub-slice.

Another embodiment of the present disclosure provides a non-transitory computer-readable storage medium storing instructions which, when executed by a processor, cause the processor to perform any of the above-mentioned methods for creating a transmission network sub-slice.

Figure 5:
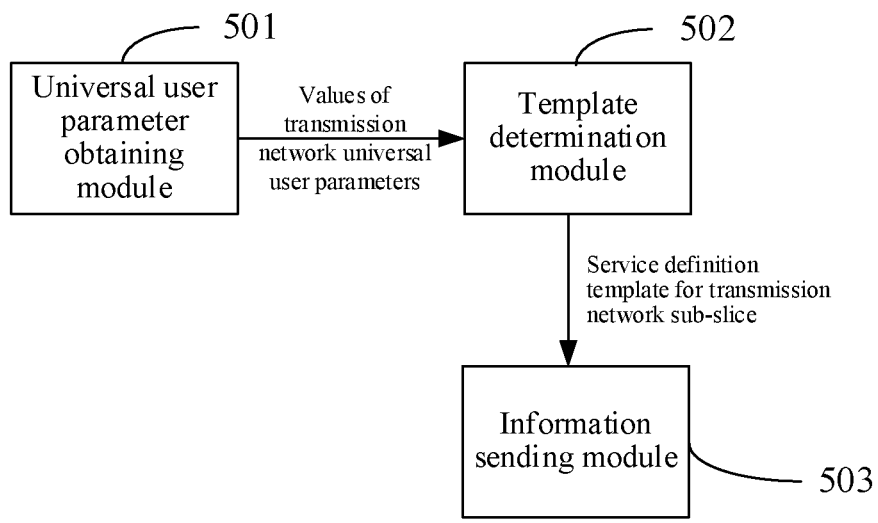
FIG. 5 is a schematic structural diagram of a device for creating a transmission network sub-slice on a network slice management device according to an embodiment of the present disclosure.

Referring to FIG. 5, an embodiment of the present disclosure provides a device for creating a transmission network sub-slice (such as a network slice management device), including the following modules.

A universal user parameter acquiring module 501 is configured to acquire values of transmission universal user parameters; where the values of the transmission universal user parameters include a value of information of an interworking network element endpoint, a value of information for determining a service definition template for a transmission network sub-slice and a value of a Service Level Agreement (SLA) attribute of the transmission network sub-slice. A template determination module 502 is configured to determine the service definition template for the transmission network sub-slice. An information sending module 503 is configured to send the value of the template name or the template ID of the determined service definition template for the transmission network sub-slice, the value of the information of the interworking network element endpoint and the value of the SLA attribute of the transmission network sub-slice.

In an embodiment of the present disclosure, the information sending module 503 is further configured to: receive a transmission network sub-slice creation-success message or a transmission network sub-slice creation-failure message; or, send a message to inquire whether the transmission network sub-slice is created successfully, and receive a transmission network sub-slice creation-success message or a transmission network sub-slice creation-failure message; or, send a message to inquire a creation progress of the transmission network sub-slice, and receive a creation progress message of the transmission network sub-slice.

In an embodiment of the present disclosure, the values of transmission universal user parameters further include a template name or a template ID.

The template determination module 502 is configured to perform at least one selected from the following:
 determining the service definition template for the transmission network sub-slice corresponding to the value of the template name or the template ID;
 determining the service definition template for the transmission network sub-slice corresponding to the value of the template name or the template ID, when a value of an SLA attribute of a service definition template for the transmission network sub-slice corresponding to the value of the template name or the template ID matches the value of the SLA attribute of the transmission network sub-slice;
 re-acquiring the value of the SLA attribute of the transmission network sub-slice or re-acquiring the value of the template ID or template name of the service definition template for the transmission network sub-slice, when a value of an SLA attribute of a service definition template for the transmission network sub-slice corresponding to the value of the template name or the template ID does not match the value of the SLA attribute of the transmission network sub-slice.

In an embodiment of the present disclosure, the universal user parameter acquiring module 501 is configured to acquire the value of the template name or the template ID in following manners: acquiring the value of the template name or the template ID input by a user; or acquiring the list of service definition templates for the transmission network sub-slice in advance, and acquiring the value of the template name or the template ID selected by the user from the list of service definition templates for the transmission network sub-slice.

In an embodiment of the present disclosure, the template determination module 502 is configured to: acquire a list of service definition templates for the transmission network sub-slice in advance; and select a service definition template for the transmission network sub-slice having a value of an SLA attribute matching the value of the SLA attribute of the transmission network sub-slice, from the list of service definition templates for the transmission network sub-slice.

In an embodiment of the present disclosure, the template determination module 502 is further configured to: when there are N service definition templates for the transmission network sub-slice each having a value of an SLA attribute matching that of the transmission network sub-slice, where N is an integer greater than or equal to 2, select one of the N service definition templates for the transmission network sub-slice each having a value of an SLA attribute matching that of the transmission network sub-slice.

In an embodiment of the present disclosure, the SLA attribute includes at least one selected from the following: bandwidth, time delay, isolation, sharing or not, and extended parameter.

In an embodiment of the present disclosure, the information of an interworking network element endpoint includes M endpoint information, where M is an integer greater than or equal to 1. Each endpoint information includes: the Identifier (ID) of the network element where the endpoint is located, the name of the network element, the name of the endpoint, the role of the endpoint, the Internet Protocol (IP) address of the endpoint, and the Virtual Local Area Network (VLAN) where the endpoint is located.

In an embodiment of the present disclosure, the transmission universal user parameters further include: an activation mode of the transmission network sub-slice, which includes any one of the following: a default activation mode and a manual activation mode.

The implementation processes of the above-mentioned devices for creating a transmission network sub-slice are the same as those of the methods for creating a transmission network sub-slice in the previous embodiments, which are not repeated here.

Figure 6:
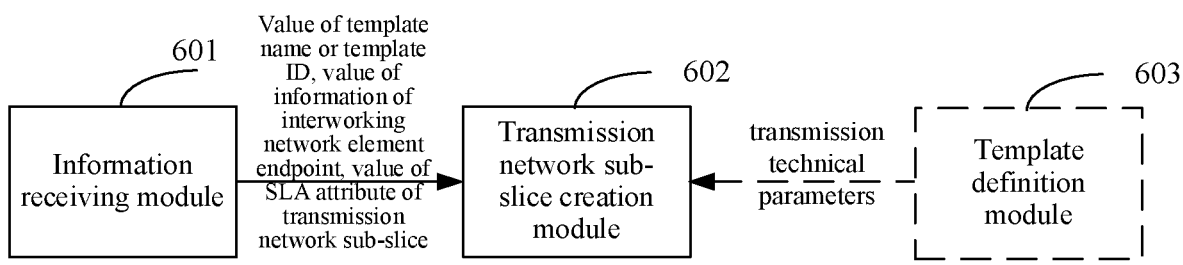
FIG. 6 is a schematic structural diagram of a device for creating a transmission network sub-slice on a transmission network sub-slice management device according to an embodiment of the present disclosure.

Referring to FIG. 6, an embodiment of the present disclosure provides a device for creating a transmission network sub-slice (such as a transmission network sub-slice management device), including the following modules.

An information receiving module 601 is configured to receive the value of the template name or the template ID, the value of the information of the interworking network element endpoint and the value of the SLA attribute of the transmission network sub-slice; an transmission network sub-slice creation module 602 is configured to create a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

In an embodiment of the present disclosure, the transmission network sub-slice creation module 602 is further configured to: return a transmission network sub-slice creation-success message or a transmission network sub-slice creation-failure message; or, receive a message to inquire whether the transmission network sub-slice is created successfully, and return a transmission network sub-slice creation-success message or a transmission network sub-slice creation-failure message; or, receive a message to inquire a creation progress of the transmission network sub-slice, and return a creation progress message of the transmission network sub-slice.

In an embodiment of the present disclosure, the device further includes the following modules.

A template definition module 603 is configured to define a service definition template for the transmission network sub-slice in advance according to a transmission technical service model and a transmission requirement of a service scenario, and issue the service definition template for the transmission network sub-slice, where the service definition template for the transmission network sub-slice defines transmission technical parameters of X layers of services for the creation of the transmission network sub-slice.

A template determination module 604 is configured to verify the transmission technical parameters of the X layers of services, and continue to issue the service definition template for the transmission network sub-slice if the verification is passed.

In an embodiment of the present disclosure at least one selected from the following parameters is also defined in the transmission network sub-slice definition template: a basic parameter, an SLA attribute.

In an embodiment of the present disclosure, the transmission technical parameters of the X layers of services are encapsulated in the service definition template for the transmission network sub-slice.

In an embodiment of the present disclosure, the transmission network sub-slice creation module 602 is further configured to: create at least one layer of service in the transmission network sub-slice according to the transmission technical parameters of the X layers of services; establish a virtual node, a virtual port and a virtual link, according to the value of the information of the interworking network element endpoint, the value of the SLA attribute of the transmission network sub-slice, and the created X layers of services.

The implementation processes of the above-mentioned devices for creating a transmission network sub-slice are the same as those of the methods for creating a transmission network sub-slice in the previous embodiments, which are not repeated here.

Figure 7:
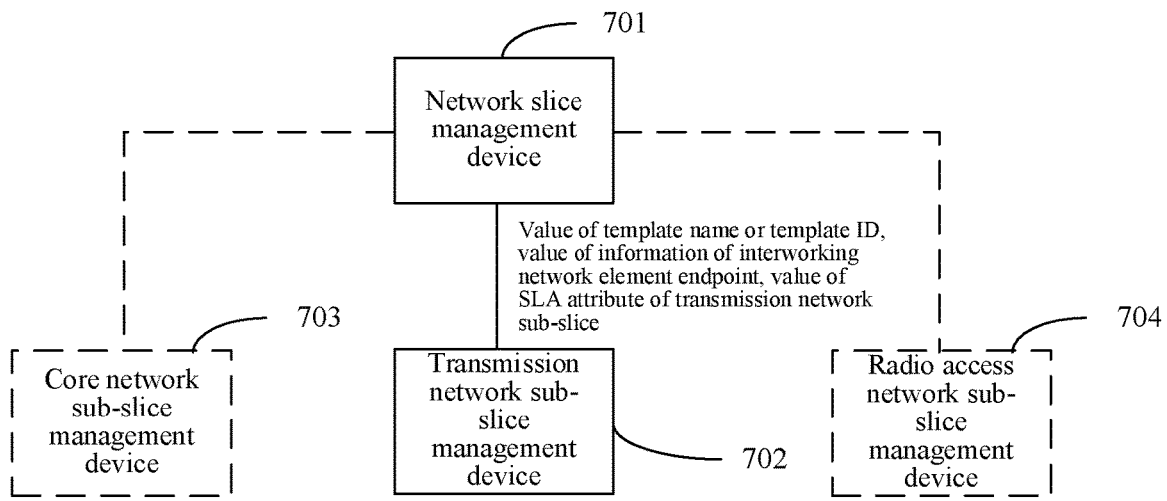
FIG. 7 is a schematic structural diagram of a system for creating a transmission network sub-slice according to an embodiment of the present disclosure.

Referring to FIG. 7, an embodiment of the present disclosure provides a system for creating a transmission network sub-slice, including the following modules.

A network slice management device 701 is configured to: acquire values of transmission universal user parameters; where the values of the transmission universal user parameters include a value of information of an interworking network element (NE) endpoint and a value of a Service Level Agreement (SLA) attribute of a transmission network sub-slice; determine a service definition template for the transmission network sub-slice according to a value of information for determining the service definition template for the transmission network sub-slice; send the value of the template name or the template ID of the determined service definition template for the transmission network sub-slice, the value of the information of the interworking network element endpoint and the value of the SLA attribute of the transmission network sub-slice.

A transmission network sub-slice management device 702 is configured to: receive the value of the template name or the template ID, the value of the information of the interworking network element endpoint and the value of the SLA attribute of the transmission network sub-slice; create a transmission network sub-slice, according to transmission technical service parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

In an embodiment of the present disclosure, the network slice management device 701 is further configured to: receive a transmission network sub-slice creation-success message or a transmission network sub-slice creation-failure message; or, send a message to inquire whether the transmission network sub-slice is created successfully, and receive a transmission network sub-slice creation-success message or a transmission network sub-slice creation-failure message; or, send a message to inquire a creation progress of the transmission network sub-slice, and receive a creation progress message of the transmission network sub-slice.

The transmission network sub-slice management module 702 is further configured to: return a transmission network sub-slice creation-success message or a transmission network sub-slice creation-failure message; or, receive a message to inquire whether the transmission network sub-slice is created successfully, and return a transmission network sub-slice creation-success message or a transmission network sub-slice creation-failure message; or, receive a message to inquire a creation progress of the transmission network sub-slice, and return a creation progress message of the transmission network sub-slice.

In an embodiment of the present disclosure, the transmission network sub-slice management module 702 is further configured to: define a service definition template for the transmission network sub-slice in advance according to a transmission technical service model and a transmission requirement of a service scenario, and issue the service definition template for the transmission network sub-slice, where the service definition template for the transmission network sub-slice defines transmission technical parameters of X layers of services for the creation of the transmission network sub-slice.

In an embodiment of the present disclosure, the transmission network sub-slice management module 702 is further configured to: verify the transmission technical parameters of the X layers of services, and continue to issue the service definition template for the transmission network sub-slice if the verification is passed.

In an embodiment of the present disclosure, at least one selected from the following parameters is also defined in the transmission network sub-slice definition template: a basic parameter, an SLA attribute.

In an embodiment of the present disclosure, the transmission technical parameters of the X layers of services are encapsulated in the service definition template for the transmission network sub-slice.

In an embodiment of the present disclosure, the values of transmission universal user parameters further include a template name or a template ID.

The network slice management device 701 is configured to determine the service definition template for the transmission network sub-slice in any of the following manners:
- determining the service definition template for the transmission network sub-slice corresponding to the value of the template name or the template ID;
- determining the service definition template for the transmission network sub-slice corresponding to the value of the template name or the template ID, when a value of an SLA attribute of a service definition template for the transmission network sub-slice corresponding to the value of the template name or the template ID matches the value of the SLA attribute of the transmission network sub-slice;
- re-acquiring the value of the SLA attribute of the transmission network sub-slice or re-acquire the value of the template ID or template name of the service definition template for the transmission network sub-slice, when a value of an SLA attribute of a service definition template for the transmission network sub-slice corresponding to the value of the template name or the template ID does not match the value of the SLA attribute of the transmission network sub-slice.

In an embodiment of the present disclosure, the network slice management device 701 is configured to acquire the value of the template name or the template ID in the following manner: acquire the value of the template name or the template ID input by a user.

In an embodiment of the present disclosure, the network slice management device 701 is further configured to: acquire a list of service definition templates for the transmission network sub-slice in advance.

The network slice management device 701 is configured to acquire the value of the template name or the template ID, by acquiring the value of the template name or the template ID input by a user.

In an embodiment of the present disclosure, the network slice management device 701 is further configured to: acquire a list of service definition templates for the transmission network sub-slice in advance.

The network slice management device 701 is configured to determine the service definition template for the transmission network sub-slice, by selecting a service definition template for the transmission network sub-slice having a value of an SLA attribute matching the value of the SLA attribute of the transmission network sub-slice, from the list of service definition templates for the transmission network sub-slice.

In an embodiment of the present disclosure, the network slice management device 701 is further configured to: when there are N service definition templates for the transmission network sub-slice each having a value of an SLA attribute matching that of the transmission network sub-slice, where N is an integer greater than or equal to 2, select one of the N service definition templates for the transmission network sub-slice each having a value of an SLA attribute matching that of the transmission network sub-slice.

In an embodiment of the present disclosure, the SLA attribute includes at least one selected from the following: bandwidth, time delay, isolation, sharing or not, and extended parameter.

In an embodiment of the present disclosure, the information of an interworking network element endpoint includes M endpoint information, where M is an integer greater than or equal to 1. Each endpoint information includes: the Identifier (ID) of the network element where the endpoint is located, the name of the network element, the name of the endpoint, the role of the endpoint, the Internet Protocol (IP) address of the endpoint, and the Virtual Local Area Network (VLAN) where the endpoint is located.

In an embodiment of the present disclosure, the transmission universal user parameters further include: an activation mode of the transmission network sub-slice, which includes any one of the following: a default activation mode and a manual activation mode.

In another embodiment of the present disclosure, the above-mentioned system for creating a transmission network sub-slice further includes a core network sub-slice management device 703 and a radio access network sub-slice management device 704.

The network slice management device 701 is responsible for providing slice management functions for the CN domain, RAN domain and TN domain, the transmission network sub-slice management device 702 is responsible for managing transmission network sub-slices, the core network sub-slice management device 703 is responsible for managing core network sub-slices, and the radio access network sub-slice management device 704 is responsible for managing radio access network sub-slices. The transmission network sub-slice management device 702 interacts with the network slice management device 701 through the northbound interface.

The network slice consists of a CN sub-slice, an RAN sub-slice and a TN sub-slice, and the TN sub-slice is responsible for providing the connectivity from the RAN domain to the CN domain in the network slice.

Figure 8:
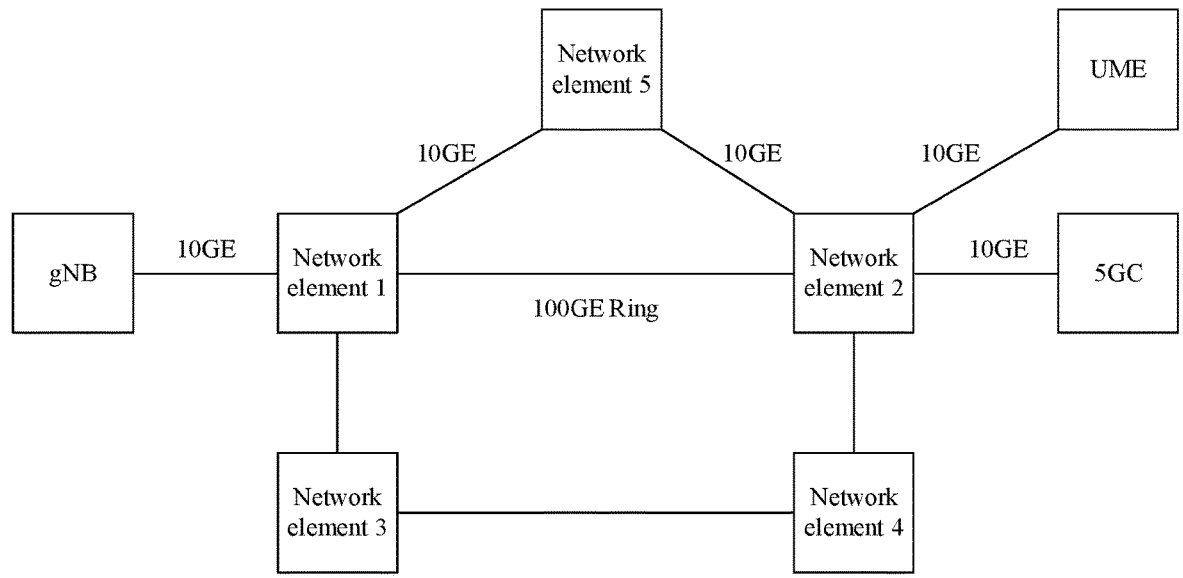
FIG. 8 is a schematic diagram of networking of network slices according to an embodiment of the present disclosure.

FIG. 8 is a schematic diagram of networking of network slices according to an embodiment of the present disclosure. As shown in FIG. 8, the Central Unit (CU)/Distributed Unit (DU) on the radio side is integrated and connected to the CORE side equipment (i.e. 5GC in FIG. 8) through the TN domain (i.e. from the network element 1 to network element 2 in FIG. 8). The transmission network sub-slice is responsible for the connectivity from the RAN domain to the CN domain in the network slice, and L3 VPN based on SR technology is used in the TN domain.

The implementation processes of the above-mentioned systems for creating a transmission network sub-slice are the same as those of the methods for creating a transmission network sub-slice in the previous embodiments, which are not repeated here.

All or some steps in the methods, functional modules/units in the systems and devices disclosed above can be implemented as software, firmware, hardware and their appropriate combinations. In the hardware implementation, the division between functional modules/units mentioned in the above description does not necessarily correspond to the division of physical components. For example, a physical component can have multiple functions, or a function or step can be performed by multiple physical components in cooperation. Some or all of the components can be implemented as software executed by a processor, such as a digital signal processor or microprocessor, or as hardware, or as an integrated circuit, such as an application specific integrated circuit. Such software can be distributed on computer-readable media, which can include computer storage media (or non-transitory media) and communication media (or transitory media). The term computer storage media includes volatile and nonvolatile, removable and non-removable media implemented in any method or technology that is configured to store information such as computer readable instructions, data structures, program modules or other data. Computer storage media include, but are not limited to, Random Access Memory (RAM), Read-Only Memory (ROM), Electrically Erasable Programmable Read-Only Memory, (EEPROM), flash memory or other memory technologies, Compact Disc Read-Only Memory (CD-ROM), Digital Versatile Disc (DVD) or other optical disc storage, magnetic box, magnetic tape, magnetic disc storage or other magnetic storage devices, or any other medium that can be set to store desired information and can be accessed by a computer. Communication media typically contain computer readable instructions, data structures, program modules or other data in modulated data signals such as carrier waves or other transmission mechanisms, and may include any information delivery media.

The invention claimed is:

1. A method for creating a transmission network sub-slice, comprising:
   acquiring, by a network slice management device, values of transmission universal user parameters; wherein the values of the transmission universal user parameters comprise a value of information of an interworking network element endpoint and a value of a Service Level Agreement (SLA) attribute of a transmission network sub-slice;
   determining, by the network slice management device, a service definition template for the transmission network sub-slice;
   sending, by the network slice management device, a value of a template name or a template ID of the determined service definition template for the transmission network sub-slice, the value of the information of the interworking network element endpoint and the value of the SLA attribute of the transmission network sub-slice; and
   receiving, by the transmission network sub-slice management device, the value of the template name or the template ID, the value of the information of the interworking network element endpoint and the value of the SLA attribute of the transmission network sub-slice;
   and creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

2. The method of claim 1, further comprising:
   returning, by the transmission network sub-slice management device, a transmission network sub-slice creation-success message or a transmission network sub-slice creation-failure message;
   or, sending, by the network slice management device, a message to inquire whether the transmission network sub-slice is created successfully, and returning, by the transmission network sub-slice management device, a transmission network sub-slice creation-success message or a transmission network sub-slice creation-failure message;
   or, sending, by the network slice management device, a message to inquire a creation progress of the transmission network sub-slice, and returning, by the transmission network sub-slice management device, returning a creation progress message of the transmission network sub-slice.

3. The method of claim 1, before creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice, further comprising:
   defining, by the transmission network sub-slice management device, a service definition template for the transmission network sub-slice in advance, according to a transmission technical service model and a transmission requirement of a service scenario; and
   issuing, by the transmission network sub-slice management device, the service definition template for the transmission network sub-slice, wherein the service definition template for the transmission network sub-slice defines the transmission technical parameters of the X layers of services for the creation of the transmission network sub-slice.

4. The method of claim 3, further comprising:
   verifying the transmission technical parameters of the X layers of services; and issuing the service definition template for the transmission network sub-slice in response to a confirmation of the verification.

5. The method of claim 3, wherein at least one of the following parameters is defined in the transmission network sub-slice definition template: a basic parameter, an SLA attribute.

6. The method of claim 3, wherein the transmission technical parameters of the X layers of services are encapsulated in the service definition template for the transmission network sub-slice.

7. The method of claim 1, wherein,
   the values of the transmission universal user parameters further comprise a value of a template name or a template ID; and
   determining, by the network slice management device, a service definition template for the transmission network sub-slice, comprises at least one of:
      determining, by the network slice management device, the service definition template for the transmission network sub-slice corresponding to the value of the template name or the template ID;
      determining, by the network slice management device, the service definition template for the transmission network sub-slice corresponding to the value of the template name or the template ID, in response to a value of an SLA attribute, of the service definition template for the transmission network sub-slice corresponding to the value of the template name or the template ID, matching the value of the SLA attribute of the transmission network sub-slice; or
      re-acquiring the value of the SLA attribute of the transmission network sub-slice or re-acquiring the value of the template ID or template name of the service definition template for the transmission network sub-slice, in response to a value of an SLA attribute, of a service definition template for the transmission network sub-slice corresponding to the value of the template name or the template ID, not matching the value of the SLA attribute of the transmission network sub-slice.

8. The method of claim 7, wherein acquiring, by the network slice management device, the value of the template name or the template ID, comprises:
acquiring, by the network slice management device, the value of the template name or the template ID which is input by a user.

9. The method of claim 7, wherein,
before acquiring, by a network slice management device, values of transmission universal user parameters, the method further comprises:
acquiring in advance, by the network slice management device, a list of service definition templates for the transmission network sub-slice; and
acquiring, by the network slice management device, the value of the template name or the template ID, comprises:
acquiring the value of the template name or the template ID selected by the user from the list of service definition templates for the transmission network sub-slice.

10. The method of claim 1, wherein,
before acquiring, by a network slice management device, values of transmission universal user parameters, the method further comprises:
acquiring in advance, by the network slice management device, a list of service definition templates for the transmission network sub-slice; and
determining, by the network slice management device, a service definition template for the transmission network sub-slice comprises:
selecting a service definition template for the transmission network sub-slice having a value of an SLA attribute matching the value of the SLA attribute of the transmission network sub-slice, from the list of service definition templates for the transmission network sub-slice.

11. The method of claim 10, wherein, in response to N service definition templates for the transmission network sub-slice each having a value of an SLA attribute matching the value of the SLA attribute of the transmission network sub-slice, where N is an integer greater than or equal to 2, determining, by the network slice management device, a service definition template for the transmission network sub-slice comprises:
select a service definition template for the transmission network sub-slice having a value of an SLA attribute matching the value of the SLA attribute of the transmission network sub-slice, from the list of service definition templates for the transmission network sub-slice.

12. The method of claim 10, wherein, the SLA attribute comprises at least one of: bandwidth, time delay, isolation, whether sharing, or extended parameter.

13. A method for creating a transmission network sub-slice, comprising:
acquiring values of transmission universal user parameters; wherein the values of the transmission universal user parameters comprise a value of information of an interworking network element endpoint and a value of a Service Level Agreement (SLA) attribute of a transmission network sub-slice;
determining a service definition template for the transmission network sub-slice; and
sending a value of a template name or a template ID of the determined service definition template for the transmission network sub-slice, the value of the information of the interworking network element endpoint and the value of the SLA attribute of the transmission network sub-slice.

14. The method of claim 13, further comprising:
receiving a transmission network sub-slice creation-success message or a transmission network sub-slice creation-failure message;
or, sending a message to inquire whether the transmission network sub-slice is created successfully, and receiving a transmission network sub-slice creation-success message or a transmission network sub-slice creation-failure message;
or, sending a message to inquire a creation progress of the transmission network sub-slice, and receiving a creation progress message of the transmission network sub-slice.

15. The method of claim 13, wherein,
the values of the transmission universal user parameters further comprise a value of a template name or a template ID; and
determining a service definition template for the transmission network sub-slice, comprises at least one of:
determining the service definition template for the transmission network sub-slice corresponding to the value of the template name or the template ID;
determining, by the network slice management device, the service definition template for the transmission network sub-slice corresponding to the value of the template name or the template ID, in response to a value of an SLA attribute, of the service definition template for the transmission network sub-slice corresponding to the value of the template name or the template ID, matching the value of the SLA attribute of the transmission network sub-slice; or
re-acquiring the value of the SLA attribute of the transmission network sub-slice or re-acquiring the value of the template ID or template name of the service definition template for the transmission network sub-slice, in response to a value of an SLA attribute, of a service definition template for the transmission network sub-slice corresponding to the value of the template name or the template ID, not matching the value of the SLA attribute of the transmission network sub-slice.

16. The method of claim 15, wherein acquiring the value of the template name or the template ID, comprises:
acquiring the value of the template name or the template ID which is input by a user.

17. The method of claim 15, wherein,
before acquiring values of transmission universal user parameters, the method further comprises:
acquiring a list of service definition templates for the transmission network sub-slice in advance; and
acquiring the value of the template name or the template ID comprises:
acquiring the value of the template name or the template ID selected by the user from the list of service definition templates for the transmission network sub-slice.

18. The method of claim 13, wherein,
before acquiring values of transmission universal user parameters, the method further comprises:

acquiring a list of service definition templates for the transmission network sub-slice in advance; and determining a service definition template for the transmission network sub-slice comprises:

selecting a service definition template for the transmission network sub-slice having a value of an SLA attribute matching the value of the SLA attribute of the transmission network sub-slice, from the list of service definition templates for the transmission network sub-slice.

19. The method of claim 18, wherein, in response to N service definition templates for the transmission network sub-slice each having a value of an SLA attribute matching the value of the SLA attribute of the transmission network sub-slice, where N is an integer greater than or equal to 2, determining a service definition template for the transmission network sub-slice comprises:

select a service definition template for the transmission network sub-slice having a value of an SLA attribute matching the value of the SLA attribute of the transmission network sub-slice, from the list of service definition templates for the transmission network sub-slice.

20. The method of claim 18, wherein, the SLA attribute comprises at least one of: bandwidth, time delay, isolation, whether sharing, or extended parameter.

21. A method for creating a transmission network sub-slice, comprising:

receiving a value of a template name or a template ID, a value of information of an interworking network element endpoint and a value of a Service Level Agreement (SLA) attribute of a transmission network sub-slice; and creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

22. The method of claim 21, further comprising:

returning a transmission network sub-slice creation-success message or a transmission network sub-slice creation-failure message;

or, receiving a message to inquire whether the transmission network sub-slice is created successfully, and returning a transmission network sub-slice creation-success message or a transmission network sub-slice creation-failure message;

or, receiving a message to inquire a creation progress of the transmission network sub-slice, and returning a creation progress message of the transmission network sub-slice.

23. The method of claim 21, before creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice, further comprising:

defining a service definition template for the transmission network sub-slice in advance according to a transmission technical service model and a transmission requirement of a service scenario, and issuing the service definition template for the transmission network sub-slice, wherein the service definition template for the transmission network sub-slice defines transmission technical parameters of X layers of services for the creation of the transmission network sub-slice.

24. The method of claim 23, further comprising:

verifying the transmission technical parameters of the X layers of services; and issuing the service definition template for the transmission network sub-slice in response to a confirmation of the verification.

25. A non-transitory computer-readable storage medium storing instructions which, when executed by a processor, cause the processor to perform a method for creating a transmission network sub-slice, comprising:

acquiring, by a network slice management device, values of transmission universal user parameters; wherein the values of the transmission universal user parameters comprise a value of information of an interworking network element endpoint and a value of a Service Level Agreement (SLA) attribute of a transmission network sub-slice;

determining, by the network slice management device, a service definition template for the transmission network sub-slice;

sending, by the network slice management device, a value of a template name or a template ID of the determined service definition template for the transmission network sub-slice, the value of the information of the interworking network element endpoint and the value of the SLA attribute of the transmission network sub-slice; and receiving, by the transmission network sub-slice management device, the value of the template name or the template ID, the value of the information of the interworking network element endpoint and the value of the SLA attribute of the transmission network sub-slice;

and creating a transmission network sub-slice, according to transmission technical parameters of X layers of services defined in the service definition template for the transmission network sub-slice corresponding to the value of the template name or the template ID, the value of the information of the interworking network element endpoint and the value of the SLA attribute of the transmission network sub-slice; where X is an integer greater than or equal to 1.

* * * * *